Nov. 22, 1932.    P. BON    1,888,344
PRODUCTION OF RELIEFS AND OF COLORED PICTURES
Filed Feb. 15, 1928
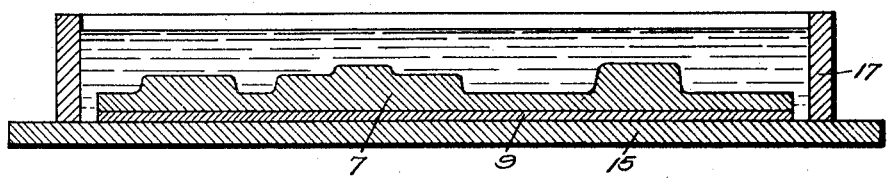
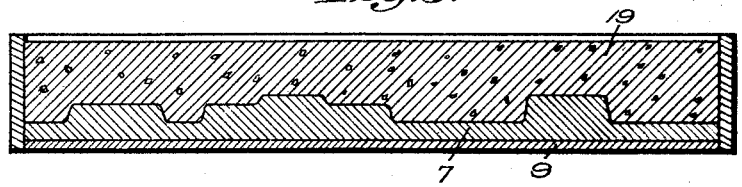
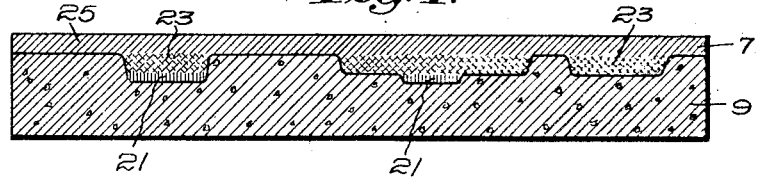
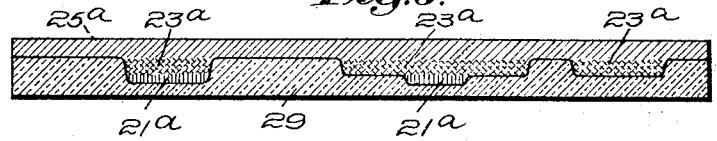
Inventor:
Piero Bon, Patented Nov. 22, 1932

1,888,344

UNITED STATES PATENT OFFICE

PIERO BON, OF VENICE, ITALY

PRODUCTION OF RELIEFS AND OF COLORED PICTURES

Application filed February 15, 1928. Serial No. 254,601.

This invention relates generally to the art of photography, and in the example which I am about to describe by way of illustration the purpose is to make a colored picture with portions thereof in relief. It will be understood, however, that various devices and methods of treatment which are utilized are applicable for other purposes, notably to the production of simple reliefs, as will be apparent to those skilled in the art from the detailed description which I am about to give of the more specific application.

In the annexed diagrammatic drawing to which reference will be made in the course of the description:—

Figs. 1 to 4 are diagrammatic sections illustrating various steps in the production of a colored relief;

Fig. 5 is a diagrammatic section of a colored relief; and

Fig. 6 is a diagrammatic section of a colored relief image in a glass matrix.

It will be understood that the drawing is purely diagrammatic and represents parts crudely and not in true proportion.

In order to produce a colored picture I may utilize an ordinary photographic negative, in which the colors of the original are represented by tones of black and white, and produce therefrom a relief (or intaglio) in which each tone of the negative or color of the original corresponds to a certain plane in the relief. By selectively applying suitable colors to the different zones or planes of relief in the image a colored image of the original may be reconstituted.

To procure such a relief I make use of the well known fact that if gelatin is treated with potassium bichromate or ammonium bichromate and in part exposed to light, those parts which have been so exposed will not swell when thereafter treated with cold water while the parts which have been protected from light and thus not actinized will swell, but I make application of this fact in a novel manner and to obtain a new result.

In order to permit a differential swelling of the actinized image so that each color or tone of the image will define a distinct plane in the resultant relief and to insure that the image will be sharply defined and free from distortion I provide for controlling the swelling action of the gelatin by modifying the cohesiveness thereof. When so modified it is possible to use a gelatin film of substantial thickness, say one millimeter or several millimeters in thickness when expanded, and I am enabled to produce a relief in which the different colors or tones of the original are represented by substantially different planes of elevation in the relief and which as a whole has even to the naked eye a palpable effect of plastically molded contour. A relief is provided, not merely in a theoretical sense, but in a colloquial sense.

To modify the cohesiveness of the gelatin I have successfully used a small quantity of starch, preferably rice starch, about one part in a thousand, mixed with the gelatin solution. For instance, the gelatin, after having first absorbed from four to six times its weight of water, may be liquefied over a hot water bath and the starch, dissolved in a little water, may be mixed and vigorously stirred therewith, the solution being removed from the bath as soon as the turbidity caused by the addition of the starch clears away. From the material just described a smooth homogenous film 7 is prepared by any convenient method and is preferably mounted on a suitable support such as suitable paper 9 or a glass plate. A suitable method is to pour the hot solution on a perfectly level, smooth plate of glass 11 surrounded with a border 13 to form a container of which the glass is the bottom, and when the layer has set, a sheet of suitable paper 9 wetted with warm water is stretched out on the upper face thereof, care being taken that there are no intervening air bubbles. The paper with the layer of gelatin is then stripped from the glass plate and fastened down by its edges to a perfectly smooth surface to dry in a current of warm air. The outer surface of the film will be the smooth surface which was in contact with the glass plate and the character of the paper, which permits water to find its way therethrough, facilitates the drying of the relatively thick layer of gelatin. However, as the support for the film is merely incidental to ease of handling I shall refer to the product as a film. The thickness of the gelatin starch may be, as has been indicated, relatively great. In the case of the solution of one part of starch and gelatin to five parts of water the thickness of the gelatin layer may vary from one to five millimeters, more or less, in accordance with the amount of relief which it is desired to obtain. The gelatin film is sensitized in a 3% to 5% solution of potassium or ammonium bichromate, to which enough ammonia has been added to render the same colorless, by being immersed in such solution for from ten to sixty minutes in accordance with the thickness of the film and the sensitiveness desired.

The sensitized film is actinized to produce a photographic image thereon. For this purpose it is convenient to utilize an ordinary black and white photographic negative and for this purpose a good, clear negative of a well lighted subject with sharp detail and if possible without secondary shadows and with the high lights in the foreground should preferably be utilized. A print may be made on the gelatin film from this negative in an ordinary printing frame by natural or strong artificial light, care being taken that the light strikes perpendicularly on the negative. It is desirable that the film be somewhat larger than the negative to provide a border thereon strongly lighted and thus rendered inert. The exposure should continue until all the details of the image appear in a deep brown color.

The printed film should then be washed thoroughly, as in running water, while kept extended as far as possible. After several hours when the parts which have been protected from the light have absorbed a sufficient amount of water and have swollen, it is desirable (see Fig. 2) to stretch the film on a strong, smooth support 15, surrounding the edges with a frame 17 to provide a container of which the film is the bottom, and thus to continue the soaking of the film, which should continue until the swelling of the gelatin starch material has produced a sufficiently high, sharp and accurate relief, for which twenty-four to forty-eight hours or more is required.

An important feature of my invention consists in the provision of a material more delicate than ordinary bichromated gelatin and in the fact that I am able with this material to differentiate in a relief different planes or degrees of relief in such a manner as to reproduce by these different planes the differences of tone in the original.

For the production of colored pictures, as hereinafter to be described, a relief of about a millimeter, or even less, is sufficient but higher reliefs may desirably be utilized for certain pictorial or plastic effects. It may be remarked that higher reliefs may desirably be used in connection with larger sizes of pictures.

When the gelatin relief has been developed to the desired point, it may be placed flat and a plaster cast made therefrom. See Fig. 3. A quick setting plaster of the best quality mixed in about three-quarters of its volume of water is desirably utilized and the thickness of the plaster should be a centimeter or more. After setting for about half an hour the slab of plaster 19 may be separated from the gelatin starch film, which, after a short immersion in water, may be used again, and the process may be repeated many times. The plaster matrix thus obtained will reproduce in intaglio the plastic relief image of the gelatin starch film in its most minute details.

From the cast or matrix thus provided a relief may be obtained in any desired manner and for any use, either as an end in itself or for further uses, for example, as a die. I shall next describe the manner in which I proceed to produce from this matrix a colored picture.

The plate should be thoroughly dried and is then preferably treated with wax for which it is desirable to utilize a mixture of three parts paraffin and one part pure beeswax. The slab may be suspended by cords in a vertical plane and dipped into a bath of this mixture, warm but not boiling, and kept therein until it completely penetrates the substance of the plaster which is indicated by the fact that bubbles no longer appear upon the surface of the latter. The slab may then be withdrawn and hung up by the suspending cords to cool and the plaster matrix is then ready to use for producing a colored picture.

It will be understood from what has been said that the high lights of the original subject correspond to the parts of the negative or intaglio matrix of plaster which are sunk most deeply beneath the ground or surface thereof, that the half-tones correspond to intermediate planes and the shadows to the highest planes. To reproduce the high lights there may be spread upon the matrix (which may first be very slightly warmed) a color of corresponding bright tones dissolved in warm water, together with a small quantity of gelatin, and this color caused to penetrate into the deepest portions of the matrix. I have indicated this diagrammatically in Fig. 4 by the conventional hatching for the color red at 21. This operation is facilitated by the fact that the paraffined matrix resists the adherence of the liquid color thereto while the color naturally tends to flow to the lowest points. The application of the color is thus quasi mechanical. By using a fine brush the penetration of the color medium into the hollows of the matrix may be facilitated. When the deepest parts of the matrix have thus been coated with the brighter colors or high tones, the color is allowed to set without drying completely and the operation is repeated (without further warming of the matrix) with a color of intermediate value in such a way that the new color medium overlies the first and moreover is applied to an intermediate zone of the matrix. This is illustrated diagrammatically in Fig. 4 by the conventional hatching for the color orange at 23. The process is carried on until the hollows of the matrix are completely coated with layers of colored gelatin, the layer last applied being of the darkest color, indicated in Fig. 4 by conventional hatching for the color brown. Knowing the colors of the original subject, it is easy to apply to the matrix corresponding colors, but it is also easy to change them as taste or desire may dictate. The showing in Fig. 4 is, of course, purely diagrammatic and the showing of certain colors dictated merely by the adaptability of their conventional hatchings for use in such a figure.

The colors which are used may be of various kinds. Good success has been had with the colors commonly known as water colors. If instead transparent color media are used, attention should be given to the effect which is produced by their superposition. In such case the principles of the usual three color process may be utilized. If oil colors are used, they cannot be mixed with a gelatin solution but should be dissolved in some suitable solvent.

While it is evident that most satisfactory results may be obtained by taking care in applying the colors, successive coats of colors may be applied to the matrix by relatively crude means, and the excess of each color wiped off before drying, and I believe it possible to provide purely mechanical means for applying the colors in accordance with this principle.

When the pigmented layer consisting of the various layers of color media has dried perfectly, it may be easily stripped from the matrix. The result will be a pigmented film (Fig. 5) in which the face which was presented to the matrix will show in relief a positive image of the original with all the colors distributed in the various corresponding planes of the matrix itself. Such a film may be mounted on any convenient support 27. In the case of a film formed of pigmented gelatin the support is preferably strong neutral paper which has first been wetted to cause it to stretch as much as possible. The paper, still damp and only superficially dried, is extended on a smooth surface and the colored film gently applied thereto and made to adhere to the paper by pressing gently on the deepest portions thereof with a wad of cotton. When the film has been stripped from the matrix, it will reproduce in relief the intaglio of the matrix and to the relief there ordinarily corresponds a depression on the back side of the film. When the film is mounted on paper it is easy to keep the relief in all those parts in which it is desirable but it is possible to do away with it or to diminish it very much in those parts in which it is not desired by flattening the film gently against the paper. Another suitable support for the pigmented film is painter's canvas, the use of which may enhance the effect of the picture, but any suitable support may be adopted, glass, wood, metal, porcelain, terra-cotta, etc., and when desirable the pigmented film may be secured to the support by means of suitable adhesive.

The colored film may have adhering to it some particles or impurities carried over from the paraffined matrix, and it is therefore desirable to wash the colored image with a swab of cotton dipped in gasoline or ether. The colors will then appear sharp and brilliant, and to prevent them from clouding after drying, the film, when made of pigmented gelatin, may be coated with wax dissolved in turpentine and then polished with a wool polisher, and the colors will acquire a permanent brilliancy. In the case of oil colors the picture may be varnished as in the case of an ordinary painting. In the case of very thick gelatin films in high relief it is desirable before extending them on their permanent support to coat the back side with glycerin, permitting the film to absorb some of it. In such case mounting on the support is facilitated by the use of starch paste or gum arabic.

While a matrix of plaster treated with the paraffin is admirably adapted to the process just described and is also desirable because of the number of such matrices which may be produced from the original relief of actinized bichromated gelatin, it may be desirable in some cases to obtain matrices of other material, particularly when it is desired to form a great number of copies from a single matrix. Obviously any suitable plastic material may be used, such as a mixture of wax, stearin, paraffin, bitumen and fatty material to which may desirably be added graphite or pottery clay in the form of a fine powder. Various other materials lend themselves to the formation of matrices, either directly from the relief of actinized bichromated gelatin or from a cast or matrix of other material, in the latter case if necessary by suitable transfers. Reliefs or intaglios may advantageously be made from the matrices by electrolytic means in well known manner.

If the film of sensitized gelatin and starch is printed from a translucent positive instead of from a negative, there will be obtained in the plaster images in relief instead of in intaglio. Such images are suitable for coloring directly with water colors with novel and excellent effects.

It should be noted that when printing from a photographic negative or positive it is easy to correct by masking or retouching in the negative or positive the shades or tones which might produce errors in relief in the corresponding plastic image.

While I have referred primarily to the reproduction of an original, three-dimensional object, naturally colored, it is obvious that the process may be utilized to obtain a relief from a drawing or picture in a plane suitably colored for that purpose. The application of various colors or tones in the manner of contour lines will permit the production of a relief of the desired contour.

A particular application of the principles of my invention is to the production of plastic and/or colored images of glass. For this purpose a relief as contrasted with an intaglio matrix may be prepared as herein described and from this matrix may be molded an intaglio image in glass 29 (Fig. 6). It will be understood that the material of the matrix must be such as to adapt it to this purpose, methods involving transfer being utilized to produce it if necessary. It will be apparent that if a glass plate prepared in this manner is held to the light, the thinner and more transparent portions correspond to the high lights and the thicker and less transparent portions to the shadows. The high lights thus appear brilliant and the shadows less so, and the transparency gives an effect of relief. If such a transparency is silvered on the back in the manner of a mirror, a striking effect of relief is obtained.

Color media, conveniently colored glass or vitrifiable colors (smalts) 21a, 23a and 25a, may be applied to the intaglio of glass as in the case of pigments to the plaster matrix and the result will be a glass image in natural colors. See Fig. 6. If transparent vitrifiable colors are used, the result will be a transparency to be viewed by transmitted light; if opaque, the result, after firing, will be an enamel relief formed in the glass.

It will be understood that the terms "relief" and "intaglio" as here used are relative and that the two things are in a sense equivalent, involving in each instance a varied offset of portions of the representation of the object from a ground or surface. In some instances in the appended claims I have used the word "glyptic" in a generic sense to include anaglyphs or reliefs and diaglyphs or intaglios.

I have described in detail one particular method of procedure illustrative of my invention. It will be apparent to those skilled in the art from this detailed description that in the course of the operations described various novel articles in themselves capable of varied practical utility have been produced and utilized. It will also be clear that various steps or combinations of steps as described may for certain purposes be used alone or in other connections. The detailed character of the description is therefore not to be understood as definitive. What I claim as new and desire to secure by Letters Patent I shall express in the following claims:

1. The method of producing a color picture which comprises preparing by photographic means a glyptic image in which the different planes correspond to different actinic color values of a multi-colored original, applying to different zones thereof color media of corresponding value, and removing the resulting pigmented film.

2. The method of producing a color picture which comprises preparing by photographic means a glyptic image in which the different planes correspond to different actinic color values of a multi-colored original, applying to different zones thereof color media of corresponding value, removing the resulting pigmented film and, at least in part, flattening the same.

3. The method of producing a color picture which comprises preparing an intaglio matrix in which the different planes correspond to different color values and having a water repellent surface, applying selectively to different zones thereof aqueous color media of corresponding value, and removing the resulting pigmented film.

4. The method of producing a picture of an object in colors which comprises photographing the same, printing from the negative on a film comprising bichromated colloid of such substantial thickness as to provide after washing and swelling of the film a palpable differentiation between the elevation of portions actinized in different degrees corresponding to the different colors of the object, washing the film, preparing a matrix therefrom, successively coating the portions of the matrix which are of different degrees of depression with color media of decreasing actinic value, and stripping from the matrix the resultant pigmented film.

5. The method of producing a relief which comprises imprinting a photographic image of a colored object on a film comprising bichromated colloid and starch, such film being of such substantial thickness as to provide after washing and swelling of the film a palpable differentiation between the elevation of portions actinized in different degrees corresponding to the different colors of the object, washing the film, molding a matrix therefrom, and preparing a relief from said matrix.

6. The method of preparing a picture which comprises forming by photographic means a matrix having an intaglio representation of a multi-colored object, the depth of incision of the parts thereof varying substantially with the actinic value of the colors of corresponding portions of the object to be represented and effecting successive applications of color media of like color value to coat successively and selectively the depressions of the matrix.

7. The method of preparing a picture which comprises forming by photographic means a matrix having an intaglio representation of a multi-colored object, the depth of incision of the parts thereof varying substantially with the actinic value of the colors of corresponding portions of the object to be represented, effecting successive applications of color media of like color value to coat successively and selectively the depressions of the matrix, and removing the pigmented film so made.

8. The method of preparing a picture which comprises forming a matrix having an intaglio representation of a multi-colored object, the depth of incision of the parts thereof varying substantially with the actinic value of the colors of corresponding portions of the object to be represented, effecting successive applications of color media of like color value to coat successively and selectively the depressions of the matrix, removing the pigmented film so made, and modifying the relief structure thereof by compression.

9. As a new article a relief representation of a colored object built up of color media, the location of which relative to the ground of the relief varies substantially with the actinic properties of the corresponding colors of the original object.

10. The method of producing a relief which comprises imprinting a photographic image of a colored object on a film comprising bichromated colloid and starch, such film being of such substantial thickness as to provide after washing and swelling of the film a palpable differentiation between the elevation of portions actinized in different degrees corresponding to the different colors of the object, washing the film, molding a matrix therefrom, and applying to zones of different elevation color media corresponding to colors of the original object.

11. As a new article in glass plate having therein an intaglio representation of an object, the depth of incision of the parts thereof varying substantially with the actinic value of the colors of the corresponding portions of the object to be represented, and vitreous colored strata in the hollow thereof, the colors thereof in the several zones being of corresponding value.

12. The method which comprises preparing by photographic means a relief image of actinized chromated colloid in which the different planes correspond to different actinic color values in the original, by suitable transfer steps molding hence a corresponding intaglio image in glass, and applying to the portions thereof which are of different degrees of depression vitrifiable color media of corresponding color value.

In testimony whereof, I have signed my name to this specification.

PIERO BON.